UNITED STATES PATENT OFFICE.

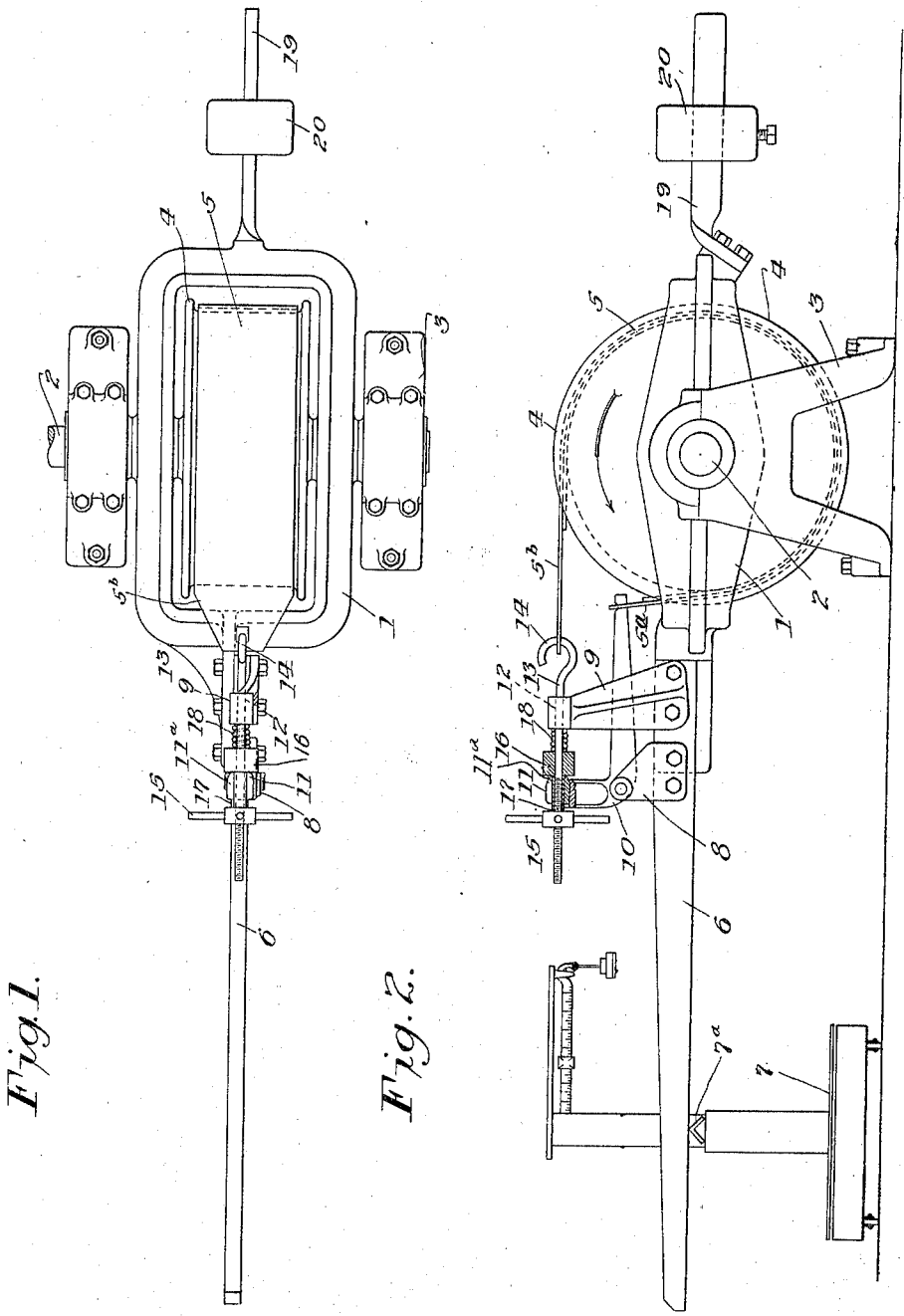

HOWARD D. MacDONALD, OF CHICAGO, ILLINOIS, ASSIGNOR, BY MESNE ASSIGNMENTS, TO INTERNATIONAL HARVESTER COMPANY, A CORPORATION OF NEW JERSEY.

DYNAMOMETER-BRAKE.

1,316,100. Specification of Letters Patent. Patented Sept. 16, 1919.

Application filed January 7, 1918. Serial No. 210,723.

*To all whom it may concern:*

Be it known that I, HOWARD D. MAC-DONALD, a citizen of the United States, residing at Chicago, in the county of Cook and State of Illinois, have invented certain new and useful Improvements in Dynamometer-Brakes, of which the following is a full, clear, and exact specification.

My invention relates to dynamometer brakes.

The object of my invention is to provide a simple and efficient means to vary the tension of brake bands, whereby the brake action will be more nearly uniform.

Another object is to provide a bell crank and spring in the tensioning means which will obviate the sticking of brake band by allowing a slight amount of slack in case the brake band suddenly becomes dry and sticks.

My invention is illustrated on the accompanying sheet of drawings, in which—

Figure 1 is a plan view of my dynamometer brake; and

Fig. 2 is a side elevation of the same, showing the brake arm placed in position on a scale.

The same reference characters designate like parts throughout the several views.

A frame member 1 is supported upon a shaft 2, which is journaled in bearings comprising part of the base member 3. Mounted upon the shaft 2 is a brake drum 4, which is provided with a brake band 5. Connected to the frame member 1 and extending forwardly therefrom is a brake arm 6, which is supported in a horizontal position by a knife edge 7$^a$ upon a scale 7. A plurality of brackets 8 and 9 are bolted to the brake arm 6 adjacent the frame member 1. The bracket 8 has pivotally connected thereto a bell crank 10 to which is fastened the tension end 5$^a$ of the brake band 5. The short arm of the bell crank extends upward, and terminates in a forked member 11. The bracket member 9 is also bolted to the scale arm and extends upward, having a hole 12 therein at its upper end. This hole 12 and the forked member 11 of the bell crank support the tension control means for the brake band.

This comprises a rod 13 fastened to the slack end 5$^b$ of the brake band by means of hook 14. The other end of the rod is threaded and carries a handwheel 15 screwed thereon. The handwheel bears against a guide 16 sleeved on the rod, and having a reduced portion 17 guided between the jaws 11 of the bell crank. When the handwheel is tightened the rounded face 11$^a$ of the bell crank is brought into contact with the shouldered portion 16, and the spring 18 mounted on the rod is compressed.

Due to the length of the forwardly extending arm and the weight of the brackets and shifting means thereon, there is a tendency to overbalance the frame member in view of the weight being so unevenly distributed. To insure a perfect balancing of the frame member, a shorter and rearwardly extending arm 19 has been provided, which is bolted to the frame, and a counterweight 20 is disposed thereon capable of adjustment along the arm 19. It can readily be seen that a perfect balancing effect is thus obtained.

The operation of my device is as follows:

The engine or motor to be tested is attached to the shaft 2 by any suitable means and started. The power therefrom rotates the shaft 2 and the brake drum 4, as shown herein, in a counterclockwise direction. The brake band is then adjusted by means of the handwheel 15, thereby applying the brake band to the drum and causing a retarding or braking action to the shaft.

The amount of the braking action may be varied by means of the handwheel 15.

The braking action may thus be calculated by means of the length of the brake arm measured from the center of the shaft 2 to the knife edge 7$^a$, the weight exerted on the knife edge 7$^a$ and the speed of the shaft.

It often happens that the brake band becomes too dry and grips the brake drum. When this happens the long arm of the bell crank will be drawn, forcing the short arm back against the spring 18 thereby slackening tension on both ends of the brake band, which will release sufficiently to permit the parts to find a point where they will be in equilibrium. By my arrangement this equalizing action is accomplished automatically and a very even torque is maintained for long periods and with very little attention on the part of the operator.

It is evident that there may be modifications in the precise arrangement herein shown and described, and it is my intention to cover all such modifications which do not depart from the spirit of my invention.

What I claim as my invention and desire to secure by Letters Patent is:

1. In a dynamometer brake, a drum, a brake band on the brake drum, a scale arm and means interposed between the brake band and scale arm for equalizing the tension on the brake band so as to maintain the torque on the scale arm nearly constant.

2. In a dynamometer brake, a drum, a brake band on the brake drum, a scale arm and means including a bell crank of unequal arms interposed between the brake band and scale arm for equalizing the tension on the brake band so as to maintain the torque on the scale arm nearly constant.

3. In a dynamometer brake, a drum, a brake band on the brake drum, a scale arm and means including a bell crank of unequal arms interposed between the brake band and scale arm, the longer arm of the bell crank being connected to the tension end of the brake band for equalizing the tension on the brake band so as to maintain the torque on the scale arm nearly constant.

4. In a dynamometer brake, a drum, a brake band on the brake drum, a scale arm and yieldable means interposed between the brake band and scale arm for equalizing the tension on the brake band so as to maintain the torque on the scale arm nearly constant.

5. In a dynamometer brake, a drum, a brake band on the brake drum, a scale arm and regulating resilient means interposed between the brake band and scale arm for equalizing the tension on the brake band so as to maintain the torque on the scale arm nearly constant.

6. In a dynamometer brake, a brake drum, a brake band, a bell crank, a scale arm connected thereto and resilient means interposed between one arm of the bell crank and one end of the brake band.

7. In a brake, a rotary shaft having a brake drum thereon, a brake band engaging the brake drum, a frame member surrounding the drum and balanced upon the shaft, said frame having arms extending forward and rearward therefrom, brackets on one of said arms, a bell crank pivotally connected to one of said brackets, tension means supported by the bell crank, and means to shift the tension means to vary the tension of the brake band.

8. In a brake, a shaft, a brake drum mounted thereon, a brake band engaging the brake drum, a scale arm mounted on the shaft, and means carried by the scale arm for adjustably applying force to the brake band embodying a bell crank having a long and a short arm, the longer arm being connected to the tension end of the brake band and the shorter arm being connected to the free end of the brake band.

9. In a brake mechanism, a drum, a brake band thereon, a tightening means for the brake band comprising a bell crank, of unequal arms, a manually operable rod connected to the short arm of the bell crank exerting a direct pull on the slack side of the brake band, and the long arm of the bell crank connected to the tension side of the brake band.

In testimony whereof I affix my signature.

HOWARD D. MacDONALD.

Copies of this patent may be obtained for five cents each, by addressing the "Commissioner of Patents, Washington, D. C."